Figure 1:
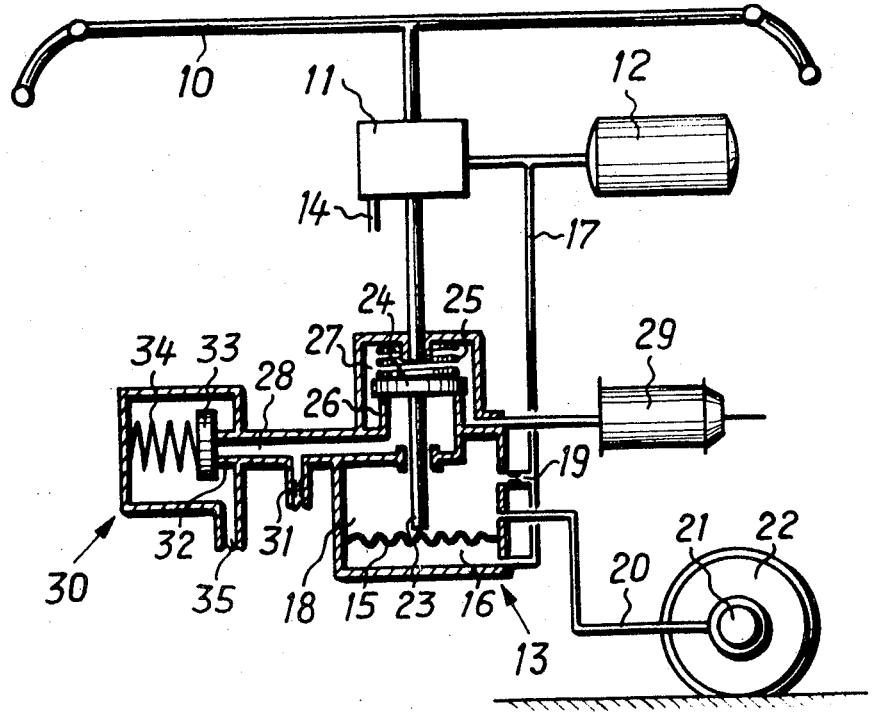

United States Patent
Keller

[15] 3,655,246
[45] Apr. 11, 1972

[54] ANTI-SLIP DEVICE FOR COMPRESSED AIR BRAKES, PARTICULARLY FOR RAIL VEHICLES

[72] Inventor: Siegfried Keller, Effretikon, Switzerland

[73] Assignee: Werkzeugmaschinenfabrik Oerlikon-Buhrle AG, Zurich, Switzerland

[22] Filed: Feb. 20, 1970

[21] Appl. No.: 13,021

[30] Foreign Application Priority Data

Feb. 28, 1969 Switzerland ..........................3025/69

[52] U.S. Cl. ......................303/21 F, 188/181 A, 303/21 CG
[51] Int. Cl. ..........................................................B60t 8/12
[58] Field of Search..............................303/21, 24, 6, 61–63, 303/68–69; 188/181

[56] References Cited

UNITED STATES PATENTS

| | | | |
|---|---|---|---|
| 2,417,211 | 3/1947 | Newell | 303/21 F |
| 2,440,343 | 4/1948 | McCune | 303/21 F |

Primary Examiner—Milton Buchler
Assistant Examiner—John J. McLaughlin
Attorney—Wenderoth, Lind & Ponack

[57] ABSTRACT

The invention relates to an anti-slip device for compressed air brakes, particularly for rail vehicles. An anti-slip device for compressed air brakes, particularly for rail vehicles, in which air is admitted to the brake cylinder through a pipe connected to an air reservoir and the brake cylinder is exhausted to atmosphere through an exhaust pipe incorporating a relay valve and a holding valve which closes the exhaust pipe at a prescribed minimum pressure.

1 Claims, 3 Drawing Figures

Patented April 11, 1972

3,655,246

Siegfried Keller, Inventor

By. Wendroth, Lind & Ponack
Attorneys

ANTI-SLIP DEVICE FOR COMPRESSED AIR BRAKES, PARTICULARLY FOR RAIL VEHICLES

The systematic increase in railroad speeds has necessitated raising the brake pressure to near the adhesion limit between rail and wheel. Since in such circumstances, whenever the rails are in poor condition due to the weather or fouling, the wheels are liable to lock when the brakes are applied, numerous anti-slip devices for the purpose of avoiding wheel lock have been proposed. In principle such anti-slip devices are all based upon the provision of a sensor on the vehicle axles which responds to excessive angular deceleration by operating a control valve in the admission pipe to the brake cylinder, and which thus shuts off the supply of compressed air to the brake cylinder and exhausts the brake cylinder as quickly as possible. Careful measurements and records made of all the events that occur in such systems have shown that when the brake cylinders are rapidly exhausted the axle which had been ciritcally decelerated by the application of the brakes generally already begins to reaccelerate when there is still a residual pressure inside the brake cylinder. In the interests of obtaining the maximum possible braking effort, even when the anti-slip device repeatedly responds on slippery rails, it is therefore desirable not to exhaust the brake cylinders fully before readmitting the air, as has been conventional, but to reduce the pressure only to a predetermined pressure level that has been ascertained by experiment.

For achieving this purpose a prior art system first reduces the brake cylinder pressure when the anti-slip device operates, by quickly expanding the air through a large cross section into an associated container to the desired predetermined pressure and by then allowing the pressure to drop more slowly by exhausting through a throttling constriction to atmosphere.

This solution has the drawback that a different expansion capacity is needed for each size of brake cylinder, and this capacity would have to be fairly bulky and heavy when the brake cylinders are large.

According to another proposal the brake cylinder is exhausted to atmosphere through a holding valve of large cross section which has been preset to maintain the predetermined pressure.

However, this means that in cases where the condition of the rails is particularly slippery the predetermined pressure may still be high enough to lock the wheels when at the high speed of modern trains the wheels are likely to develop large flats. The object of the present invention is to avoid the above-described defects. The proposed anti-slip device consists in providing the exhaust pipe between the relay valve and the holding valve with a throttling constriction that continuously communicates with the ambient atmosphere.

This arrangement has the advantage that the air in the brake cylinder when the anti-slip device operates will first exhaust through a large cross section to atmosphere until the predetermined pressure is reached and thereafter, when the holding valve has been closed, more slowly through a smaller cross section until the pressure is atmospheric.

Figure 2:
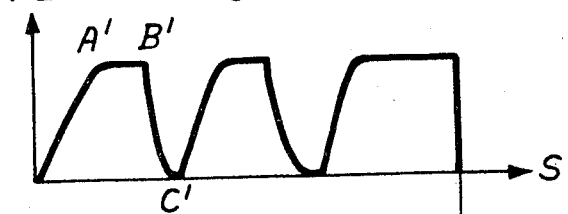
Figure 3:
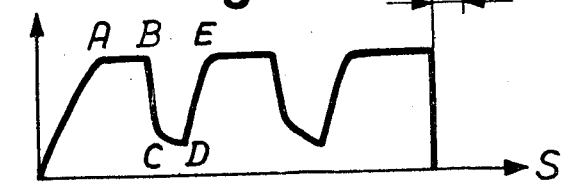

With the above and other objects in view which will become apparent from the detailed description below, a preferred embodiment of the invention is shown in the drawings in which:

FIG. 1 is a cross section with parts in elevation of an indirectly acting compressed air brake associated with an anti-slip device according to the invention, schematically shown, and FIG. 2 is a graph showing the brake cylinder pressure as a function of the distance travelled by the vehicle during wheel slip in equipment of the above-described prior art kind, whereas FIG. 3 is a graph showing the pressure during wheel slip when equipment according to the present invention is provided.

Referring to FIG. 1 the main brake pipe 10 of a rail-road carriage not shown in the drawing is connected to a triple distributor valve 11. This distributor valve 11 is connected on the one hand to an air reservoir 12 and on the other hand to a relay valve 13. The release pipe of the distributor valve is at 14.

The relay valve 13 contains a diaphragm 15. Below the diaphragm 12 is a chamber 16 which is connected by a pipe 17 to the reservoir 12 for compressed air. Above the diaphragm 15 is a second chamber 18 which is connected on the one hand through a constriction 19 and the pipe 17 to the air reservoir 12 and on the other hand through a pipe 20 to a deceleration sensor 21. The deceleration sensor 21 is mounted on the axle of a vehicle wheel 22. It is not shown in detail but so contrived that when a given deceleration is exceeded it allows air to escape from the pipe 20 and hence from the chamber 18.

A stem 23 is attached on the diaphragm 15 of the relay valve 13, the stem carrying a valve disk 24. The valve disk 24 is pressed by a spring 25 against a valve seat 26 of the relay valve 13. In the position illustrated, the valve disk 24 separates a chamber 27 from an exhaust line 28. On the one hand, the distributor valve 11 is connected to the chamber 27 of the relay valve 13 and, on the other hand, a brake cylinder 29 is connected to the said chamber, which cylinder is connected to an exhaust line 28 in the second position of the valve disk 24, which is not illustrated; at the same time, the brake cylinder is disconnected from the distributor valve.

The exhaust pipe 28 communicates through a holding valve 30 and through a throttling constriction 31 with the ambient atmosphere. The holding valve 30 is designed in the manner of a check valve. The end of the exhaust pipe 28 directly forms a valve seat 32 against which a spring 34 presses a valve element 33. The thrust of this spring 34 can be adjusted by means, such as a screw, not specially shown. The inside of the valve casing is continuously open to atmosphere through an opening 35.

The described anti-slip device functions as follows:

When the brake is released the pressure in the main brake pipe 10 is the normal system pressure and the air reservoir 12 is full. The pressure in the two chambers 16 and 18 of the relay valve 14 is likewise the system pressure. The brake cylinder 29 is connected by the relay valve 13 and the distributor valve 11 to the brake release outlet 14 of the distributor valve 11 and is therefore exhausted.

For applying the brake the pressure in the main brake pipe is reduced in conventional manner and the distributor valve 11 operates to admit air from the air cylinder 12 into the brake cylinder 29, the pressure admitted into the brake cylinder 29 corresponding to the pressure reduction in the main brake pipe.

If during the application of the brakes the deceleration sensor 21 should respond because the rails are slippery, then the chamber 18 of the relay valve 13 will exhaust through the pipe 20. The pressure existing in the chamber 16 of the relay valve 13 causes the valve disc 24 to be lifted off the valve seat 26 against the thrust of the spring 25 and the air in the brake cylinder 29 can therefore enter the exhaust pipe 28. At the same time the admission of air through the distributor valve 11 to the brake cylinder 29 is cut off by the valve disc 24. As soon as the pressure in the exhaust pipe exceeds a given level the valve element 33 of the holding valve 30 is raised from its seat 32 against the retaining power of its spring 34 and the air can escape from the brake cylinder 29 until the pressure in the pipe 28 is again less than said predetermined level and the holding valve 30 closes again.

The air remaining in the brake cylinder can then gradually continue to escape completely through the throttling constriction 31. The change in pressure in the brake cylinder 29 as a function of the braking distance S is shown in FIG. 3. The distance A to B corresponds to the pressure for full application of the brake. Should the deceleration sensor 21 respond because the rails are slippery the pressure will first drop from B to C for as long as it is still above the level determined by the holding valve 30. When the closing valve 30 shuts the pressure in the brake cylinder 29 continues to fall more slowly from C to D by the air exhausting through the throttling constriction 31. As soon as the deceleration sensor 21 ceases to exhaust air from the pipe 20 the pressure will rise again from D to E. If the rails are still slippery the described process repeats itself.

In contradistinction thereto, as shown in FIG. 2, in the above previously described prior art arrangement the pressure always first falls to zero from B' to C'. The total braking effort which is defined by the area embraced by the curve is therefore less. In other words, braking takes longer and the distance required for reducing the speed of the carriage to a given speed is also longer.

I claim

1. An antiskid device for a compressed air brake of a railroad vehicle, comprising a brake cylinder, a control distribution valve for filling and emptying said brake cylinder, a deceleration sensor responding to the deceleration of a wheel during braking on a slippery rail, a compressed air holding valve, means closing said holding valve when the air pressure drops to a predetermined value, a relay valve having a first chamber connected to said brake cylinder, a second chamber in said relay valve connected to said holding valve, a valve disk in said relay valve actuated by said deceleration sensor, said valve disk in a first position separating said first chamber from said second chamber and in a second position separating said brake cylinder from said control distribution valve and connecting it to said second chamber for a rapid lowering of air pressure in said brake cylinder to the air pressure predetermined by said holding valve in the case of a brief response of said deceleration sensor during the braking action on a slightly slippery rail, an exhaust pipe connecting said relay valve and said holding valve, and a throttling constriction in permanent communication with the atmosphere positioned in said exhaust pipe, so that when said holding valve closes to said predetermined value some pressure remains in the brake cylinder prior to the re-application of the brakes, said residual pressure being exhausted through said throttling constriction in the case of a long response of said deceleration sensor during the braking action on a very slippery rail.

* * * * *